June 6, 1939.  E. C. BIXEL ET AL  2,161,006
CABSCOPE
Filed Nov. 20, 1937
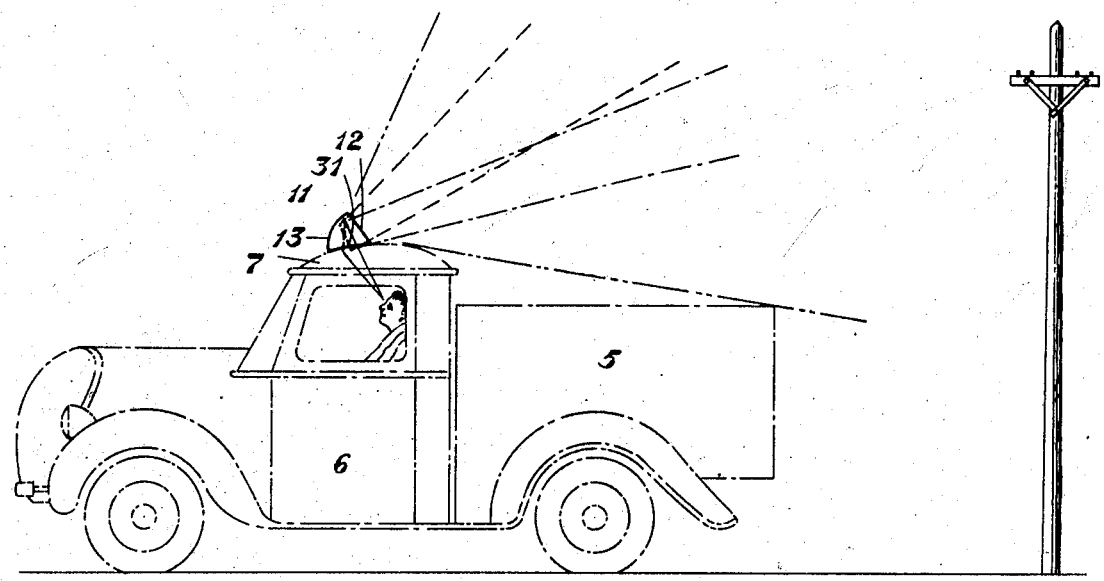
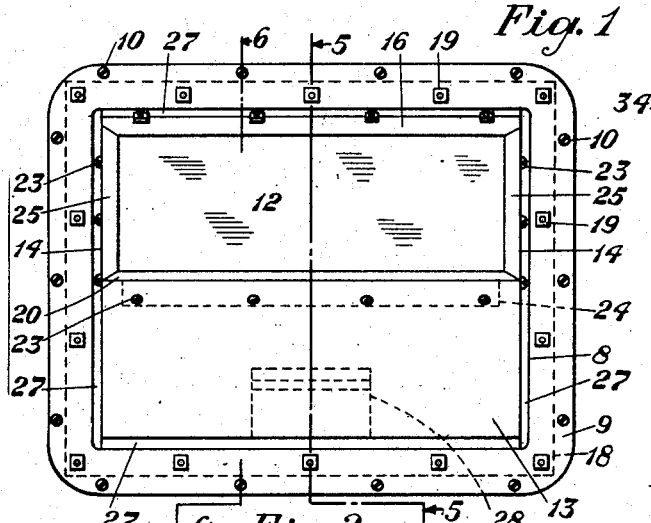
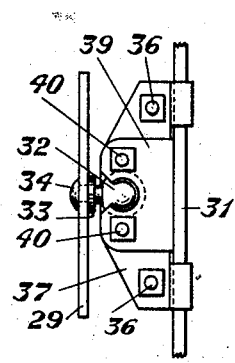
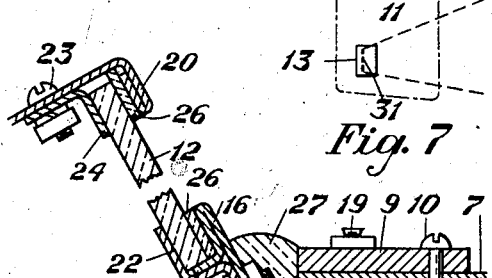
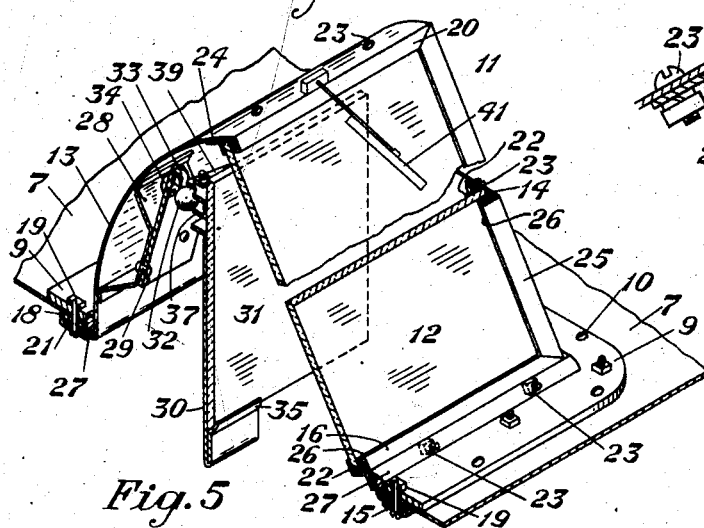
INVENTORS
E.C.Bixel and H.D.Brown
BY William R Ballard
ATTORNEY Patented June 6, 1939

2,161,006

UNITED STATES PATENT OFFICE 2,161,006

CABSCOPE

Edward Carl Bixel, West Orange, and Howard D. Brown, Westfield, N. J., assignors to American Telephone and Telegraph Company, a corporation of New York Application November 20, 1937, Serial No. 175,712

1 Claim. (Cl. 88—93)

This invention relates to rear vision mirror structures for automotive apparatus, and the like, whereby an operator seated in a cab of a vehicle in driving position may have a broad range or field of view above and to the rear of the vehicle.

Automotive apparatus such as trucks are extensively used in connection with the construction and maintenance of electric transmission lines and other work. This work involves operations on derricks, truck-mounted ladders, poles and aerial structures. The trucks are also used to carry various materials or tools on their tops or their sides or platforms which extend beyond the ends of the trucks. It is necessary that the driver of a motor vehicle shall have definite knowledge of the progress of the operations in which the vehicle is engaged and which are carried on, for most part, above and to the rear of the vehicle. It is also necessary that the driver shall have a sufficient range of view to the rear of and above the vehicle when tools or materials are carried thereby, so that proper clearance may be provided to turn corners safely, and for other obvious reasons.

Accordingly, it is an object of this invention to provide a reflecting arrangement whereby the operator seated in a driving position in a cab or vehicle shall have a substantially unobscured range of vision to the rear and above the cab so that the operations being performed can be readily observed, or so that proper clearance in turning corners, or the like, is provided.

Another object is to provide a device of this character which is simple and rugged in construction.

These and further objects will be apparent from the following description when considered in connection with the accompanying drawing, in which one embodiment of the invention is illustrated.

In the drawing, in which like characters of reference designate like parts throughout, Figure 1 is a side elevation of the device shown in position on the roof of a vehicle cab.

Fig. 2 is a plan view of the improved device.

Fig. 3 is a side elevation of the adjustable mounting for the mirror element of the device.

Fig. 4 is a plan view of Fig. 3.

Fig. 5 is a broken-away perspective view, taken on the line 5—5 of Fig. 2, looking in the direction of the arrows.

Fig. 6 is a broken-away enlarged view, taken on the line 6—6 of Fig. 2, looking in the direction of the arrows.

Fig. 7 is a diagrammatic top view of the cab and improved reflecting apparatus showing the angular range of vision of a driver seated in the cab.

Referring to the drawing by characters of reference, 5 indicates generally the body of a motor-driven vehicle which is carried by a suitable frame or chassis mounted on wheels. It will be understood that while the improved device is shown in connection with a certain type of body it is equally well adapted to be used with other types of vehicle bodies. The body 5 is shown as being provided with an ordinary form of cab 6 which may be occupied by a driver.

The roof of the cab 7 is cut away to provide a rectangular opening 8 which may lie slightly toward the forward portion of the cab and in front, and over the driver's head. A reinforcement is provided about this opening consisting of a rectangular formed strip of flat malleable metal 9 having rounded corners. The inner edges of this strip co-terminate with the edges of the opening, and strip is secured to the roof by means of screws 10, or the like.

The opening is covered by a housing 11 which co-operates with the metal strip 9 in a manner to be presently described. This housing comprises a safety glass panel 12 which extends in an inclined forwardly direction from the cab roof and forms a rear partition for the housing 11. A front partition for the housing is formed by an arcuate-shaped metal plate 13 which interconnects the cab roof with the top of the frame for the safety glass 12. The sides for the housing are formed by sector-shaped panels 14 which extend upwardly from the cab roof to the frame for the safety glass panel 12, and also to the arcuate-shaped front partition 13.

The frame for the safety glass 12 is formed from any suitable metal, and the bottom portion thereof, as more clearly indicated in Fig. 6, has its end turned upon itself, as shown at 15. The frame then extends upwardly in an inclined direction and is bent upon itself as shown at 16, and terminates in an angular flange 17 which forms a support for the bottom of the glass panel 12. The bottom portion 15 of the frame is positioned on the inner side of the cab roof and an interposed rubber gasket lies between this bottom portion and the ceiling of the cab. This gasket is of rectangular formation and lies upon the ceiling of the cab about the edges of the opening 8. Machine screws, bolts, or the like, 19, extend through the portion 15 of the frame, gasket 18, cab roof 7 and reinforcing plate 9, and secure these elements tightly together. The support for the top of the frame for the safety glass 12 is formed from the edge of one end of the arcuate-shaped front partition 13. The other end of this partition terminates in an edge 21. The edges 20 and 21 are bent upon themselves and these bent portions extend across the glass panel 12 and across the arcuate-shaped portion 13, respectively. Spaced angular retaining clips 22 are provided about the safety glass panel on its bottom and sides. These clips are secured in position by screws 23, or the like. The top of the safety glass panel may be retained in position by a longitudinal angular member 24. The sides of the frame for the safety glass panel are formed from an end of each of the sector-shaped side panels 14. These ends are turned about the side edges of the safety glass and bent upon themselves as shown at 25 in Fig. 5. The corners of the frame are suitably beveled and welded together, and a gasket 26 is provided between the frame and the safety glass 12.

The arcuate-shaped front panel 13, has the edge of its front or bottom end turned upon itself, as formerly outlined, and this end is secured by screws 19 to the reinforcing plate 9, which screws also extend through the rectangular-shaped gasket 18 and through the cab roof 7, similarly to that described in connection with the bottom end 15 of the frame for the safety glass 12.

The bottom edges of the sector-shaped side portions 14 are tuned upon themselves, similarly to that outlined in connection with the lower edges 15 of the frame for the safety glass and also the edge 21 of the arcuate-shaped front portion 13. These edges are also secured in position by screws 19 which also pass through the roof and interposed gasket 18, as formerly described. The meeting ends of each of these turned-in edges which form corners are suitably welded together. A sealing compound 27 of any suitable character is applied to the four sides and about the corners of the housing comprising the safety glass partition, the two side partitions and the front partition. This compound as illustrated in section in Fig. 6, provides proper weather-proofing to prevent any leakage through the cab roof around the housing.

The front partition 13 carries a bracket 28 which may be of the formation indicated in Fig. 5. This bracket 28 is secured at its ends to said partition, and the central portion is raised. This raised portion carries a unit consisting of a plate 29 on which is adjustably mounted a frame 30 carrying a mirror 31, as shown in Figs. 3 and 4. The plate 29 is riveted or bolted at its lower portion to the bracket 28 and is provided at its upper portion with an opening through which a rod carrying a ball 32 extends. This rod has a shoulder portion 33 which abuts the plate 29 and the end of the rod extends through the opening in the plate and is peened or upset, as shown at 34, thus holding the rod securely in position on the plate 29. The mirror 31 and its holder 30 and component parts are held in swivel connection with the ball 32. The holder 30 has an upturned portion terminating at one end in a supporting bracket 35 for the mirror 31. The other or upper end of the holder 30 extends perpendicularly from the main portion and is formed into a flange, which has openings provided therethrough in which screws 36, 36 are engaged. These screws pass upwardly through openings in a horizontal member 37 extending from the mirror retaining bracket 38. This bracket has an additional horizontally extending member 39 which lies parallel to the member 37, and the members 37 and 39 are interconnected by screws 40. The plates 37 and 39 have coinciding openings therethrough, and the adjacent edges of these plates are flared or bumped out to form a socket in which the ball 32 is seated. The upper member 39 has a cutaway portion extending from its edge which is adjacent to the plate 29 to its flared opening to permit the mirror to be rotated about the ball 32 as an axis. The interconnecting screws 40, 40 for the plates 37 and 39 serve to adjust the plates with respect to each other and maintain a proper socket connection for the ball 32.

A windshield wiper 41 is suitably carried upon the housing, as shown in Fig. 5, for the purpose of keeping the safety glass 12 free from rain or other moisture.

By means of the present arrangement, maximum safety is assured to men engaged in the operations previously enumerated, as the driver while seated in the cab can clearly observe by reflections in the mirror, and through the rear glass partition, all that takes place above and to the rear of the truck. The range of vision above the truck is shown by dotted lines in Fig. 1, and the range of vision to the rear of the truck is indicated by dotted lines in Fig. 7.

While the arrangements of this invention have been illustrated as embodied in certain specific forms which have been deemed desirable, it will be understood that they are capable of embodiment in many and widely varied forms without departing from the spirit of the invention, as defined in the appended claim.

What is claimed is:

In combination with a vehicle body having a roofed cab and an opening therethrough, a housing covering the opening and having an upper portion projecting well above the top surface of the cab roof and including a front arcuate-shaped supporting partition, a steeply inclined rear transparent partition having a top edge connected to and forming an apex with a like edge of the front partition and side walls connecting said partitions, and a mirror adjustably mounted for universal movement on the front supporting partition, said transparent partition being arranged at such an angle with respect to the horizontal as to permit a wide range of vision therethrough above and to the rear of the cab, and said mirror normally lying in a plane in substantially vertical alinement with said apex and being mounted in such close proximity to said transparent partition that approximately vertical light rays passing through said transparent partition will strike the mirror so that when properly adjusted it will reflect toward the driver a view from above and to the rear of the cab thereby enabling the driver to observe operations carried on above and also to the rear of his position.

EDWARD C. BIXEL.
HOWARD D. BROWN.